United States Patent [19]
Morrice

[11] 3,969,904
[45] July 20, 1976

[54] METHOD OF LAYING A PIPELINE IN A TRENCH

[75] Inventor: Anthony Ronald Seaton Morrice, Harrogate, England

[73] Assignee: Hudswell Morrice Ltd., Leeds, England

[22] Filed: Feb. 11, 1974

[21] Appl. No.: 441,713

[52] U.S. Cl. .................................. 61/106; 61/41 A
[51] Int. Cl.² ........................ F16L 1/00; E21D 7/00
[58] Field of Search ................... 61/41 A, 72.1, 72.5

[56] References Cited
UNITED STATES PATENTS

| | | | |
|---|---|---|---|
| 3,212,270 | 10/1965 | Benintend | 61/41 A |
| 3,606,757 | 9/1971 | De Weese et al. | 61/41 A |
| 3,693,358 | 9/1972 | Morrice | 61/41 A |
| 3,729,938 | 5/1973 | Morrice | 61/41 A |
| 3,782,125 | 1/1974 | Moll | 61/41 A |
| 3,820,345 | 6/1974 | Brecht | 61/41 A |

FOREIGN PATENTS OR APPLICATIONS 667,988   3/1952   United Kingdom ................. 61/41 A Primary Examiner—Jacob Shapiro
Attorney, Agent, or Firm—Fred Philpitt

[57] ABSTRACT

A method which includes excavating a first pilot trench and a second pilot trench, shoring up said first pilot trench, forcing two lines of plate means vertically downwardly into the earth to a level substantially below the level of the bottom of said first pilot trench, excavating the material between said two plate means so as to form a deep trench disposed below said first pilot trench, inserting pipe sections into said trench, withdrawing said plate means vertically upwardly, covering said pipe sections with earth, supporting the shoring framework at approximately ground level while advancing the trench shoring frame horizontally into said second pilot trench, said advancement being achieved by applying hydraulic pressure between said shoring framework and an end wall that is pressed against earth deposited rearwardly of said first pilot trench.

3 Claims, 7 Drawing Figures

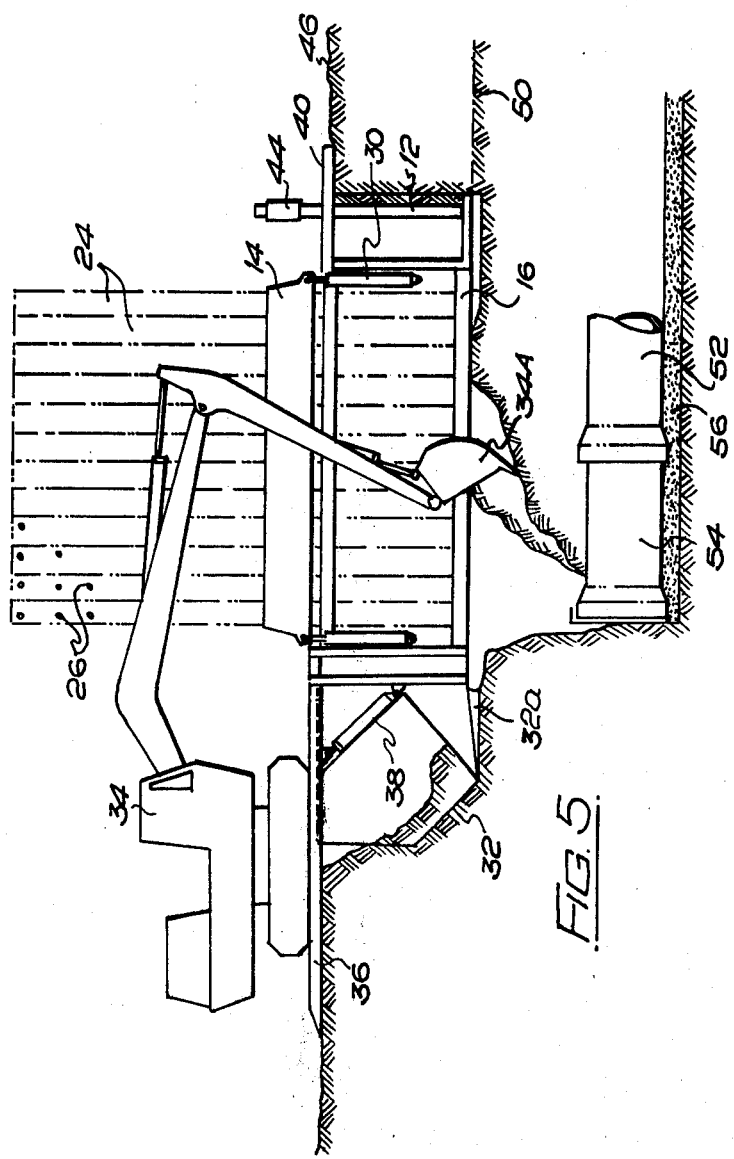

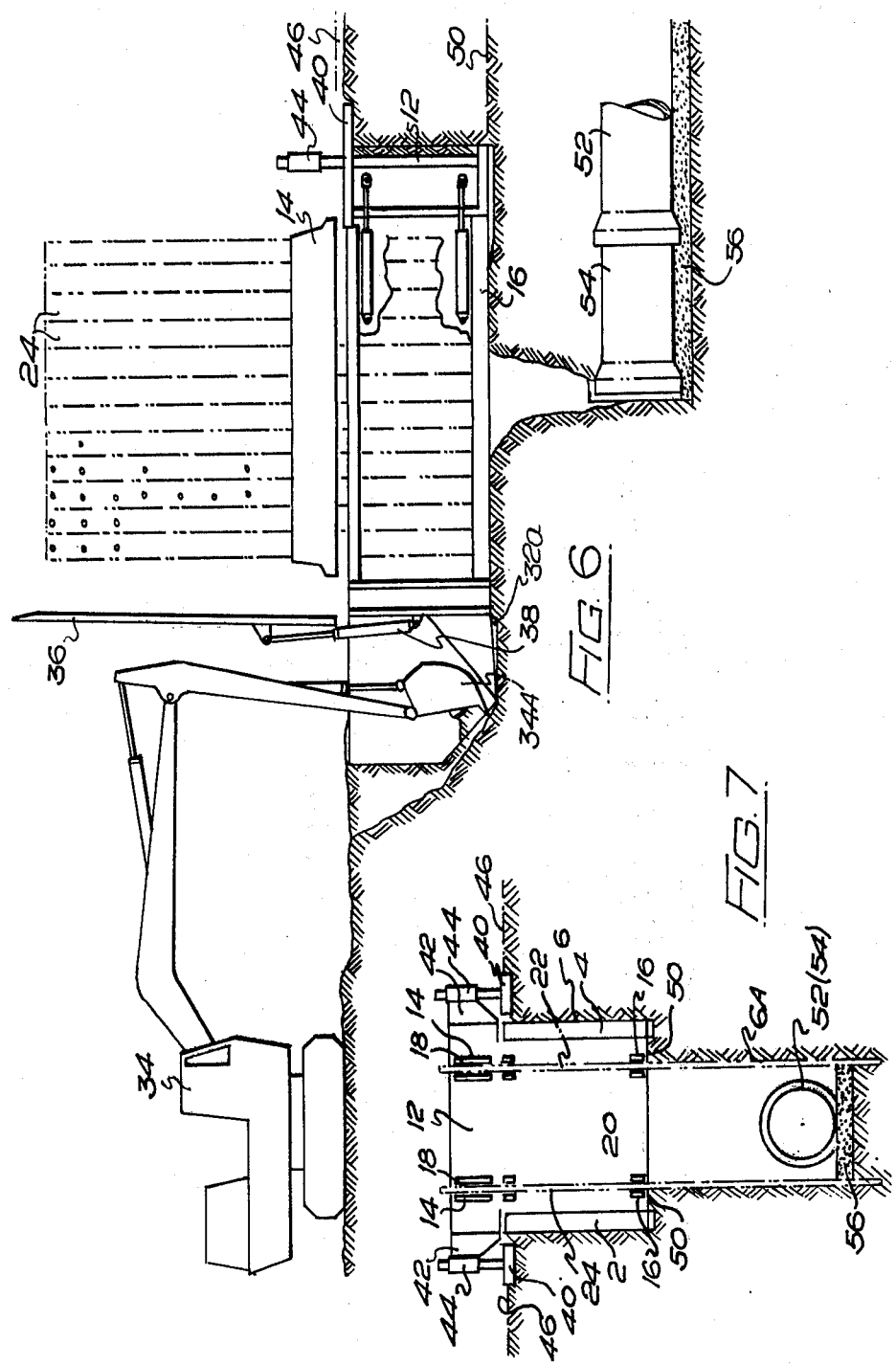

METHOD OF LAYING A PIPELINE IN A TRENCH

One known method and apparatus involves the use of a cage which is dragged and lifted into a partially dug trench which is wider than the cage, a plurality of cantilevered shear members being movable relative to the cage to support the lower part of the trench which is then dug below the cage. The forward end of the cage rests upon the partially dug trench and the rear of the cage is supported on a pipe section previously laid, and because the rear of the cage is supported in this way, it is highly probable that unless the pipe is very large and substantial, the pipe will be damaged and/or disturbed as the cage is dragged, and lifted forward. In supporting the rear of the cage on the pipe section, the cage is provided with a pair of feet which actually rest on the pipe section and which therefore necessitate accurate location i.e. excavating since if only one of the feet engages the pipe, the cage will have a tendency to shift sideways, and so destroy the line of progression. Difficulty will be experienced in setting the cage to line of level each time it is moved i.e. dragged and lifted forward by the crane and re-positioned and in addition the removal and re-insertion will be time-consuming and therefore expensive.

The prior known method and apparatus is extremely limited in its application in that the method and apparatus is useful only in the laying of very large diameter pipes, e.g. 12ft diameter i.e. pipes which are massive enough to support the rear of the cage.

Another disadvantage is that the apparatus is designed to fully support only the lower part of the trench i.e. that part of the trench below the cage since if cave-ins and the like occurred so to put pressure, or increase the pressure, on the side walls of the cage, then excavation at the sides of the cage would be necessary in order to enable the cage to be moved forward.

A further disadvantage is that the apparatus must be positioned rigged up to the face i.e. the leading wall, of the excavation and if the ground which is being excavated is poor and/or water bearing, then great difficulty will be experienced in positioning the excavator ready for digging within the cage and inserted shear members. This difficulty may be overcome to some degree by refilling at the front of the cage in order than the excavator may be better positioned, but such a solution is thought to be unsatisfactory.

A still further disadvantage with the known device is that to give full protection to workmen, the cage, the rear of which must rest on the pipe section and therefor has its lower extremity a constant distance from the bottom of the trench, must be increased in depth.

Most of the above disadvantages are the result of supporting the rear of the cage on the laid pipe sections, and it is an object of the present invention to provide an improved method and apparatus for use in the laying of a pipeline in a trench without the above disadvantages and limitations.

Accordingly, one aspect of the present invention provides a method for the laying of a pipeline in a ground trench comprising the steps of excavating a first pilot trench, inserting in said pilot trench a trench shoring apparatus so as to support the side walls of said trench, excavating a further section of the pilot trench in advance of the shoring frame, inserting into the bottom of said pilot trench a plurality of vertically disposed plate means, excavating a second trench to the required depth between said inserted vertically disposed plate means so that the sides of said second trench are fully supported by said plate means, the width of said second trench being less than the width of said pilot trench so that a ledge is formed between the pilot trench and the second trench, inserting a pipe section into said second trench, withdrawing the vertically disposed plate means, supporting the trench shoring apparatus from ground level and advancing the trench shoring frame into said further section of the first trench.

The method according to the invention will include the additional step of placing a platform so that it straddles the further section of the pilot trench and moving an excavator onto said platform so that said excavator may excavate said second trench between the inserted vertically disposed plate means.

According to a second aspect of the present invention, there is provided apparatus for use in the laying of a pipeline in a trench comprising a trench shoring apparatus comprising opposed side wall structures for engaging the side walls of a ground trench when said shoring apparatus is in said trench, said side wall structures being supported in spaced-apart relationship so as to be capable of supporting the trench walls, and means for supporting the trench shoring apparatus from ground level.

The trench shoring apparatus will also preferably include a thrust plate structure located towards the rear of the side wall structures and connected to the side wall structures by power-operated jacks, said thrust plate being operable through said jacks to cause said side wall structures to be advanced along the trench by jacking the thrust plate structure against back fill placed in the trench behind the thrust plate structure.

Preferably the apparatus will include a plurality of vertically disposed plate means capable of being moved up and down relative to said side wall structures out of and into the ground below the lowermost level of the side wall structures when the shoring apparatus is in said trench.

Preferably there will be means for moving said plate means relative to the side wall structures of the trench shoring apparatus said means comprising a movable drive structure capable of making releasable driving engagement with said plate means, drive means connecting the driving frame to structure of the trench shoring apparatus, said drive means being operable to move said driving frame and plate means connected thereto relative to the side wall structures of the trench shoring apparatus.

The means for supporting the trench shoring apparatus from ground level will comprise two bearing pads one at either side of the trench shoring apparatus, said bearing pads being movable relative to the trench shoring apparatus by power-operated means.

The trench shoring apparatus will preferably include at its forward end a platform adapted to be raised and lowered relative to the trench shoring apparatus, the platform being capable of supporting an excavator for excavating between the inserted plate means.

In order that the invention may be more readily understood, an embodiment thereof will now be described by way of example, reference being made to the accompanying drawings, in which:

FIG. 5 shows the apparatus in a still further stage of operation;

FIG. 6 shows the apparatus in its final stages of a cycle of operations; and

FIG. 7 is a sectional end elevation of the apparatus taken along the lines VII — VII in FIG. 4, the excavator having been omitted for the sake of clarity.

Figure 4:
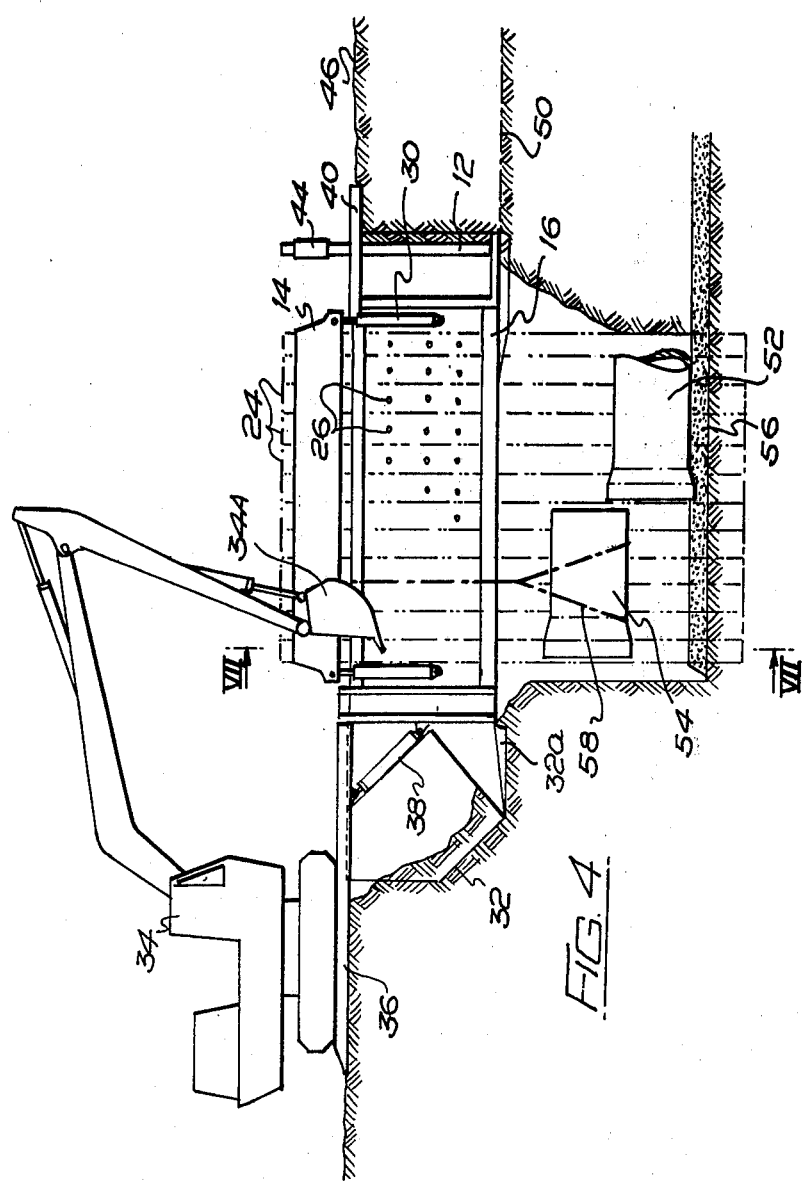
FIG. 4 is a view similar to FIGS. 1 to 3 and showing the apparatus of the invention in yet another position of operation.

Referring to the drawings, the trench shoring apparatus of the invention comprises a pair of opposed side wall structures 2 and 4 for engaging the side walls of a ground trench 6, the side wall structure being held in spaced-apart relationship by cross-members (not shown) so as to be capable of supporting the walls of the trench 6. The side wall structures 2 and 4 are connected through pairs of hydraulically-operated jacks 8 and 10 to a thrust plate structure 12 located towards the rear of the side wall structures, the thrust plate structure extending transversely to the side wall structures as shown in FIG. 4. The hydraulically operated jacks 8 and 10 are operable to cause relative movement between the thrust plate structure 12 and the side wall structures 2 and 4, the thrust plate structure 12 firstly being moved rearwardly so as to compact spoil returned behind the thrust plate structure and then to cause forward movement of the side wall structures 2 and 4 in the direction "X" of the trench.

The side wall structures 2 and 4 each carry vertically spaced frames 14 and 16 each having elongated slots 18 and 20 through which may pass vertically disposed plate means 22 and 24. The upper frames 14 constitute driving frames for the vertically disposed plate means 22 and 24, and the lower frames 16 constitute guide frames for said plate means. The upper frames 14 each have a plurality of horizontally spaced apertures or holes (not shown) which are for receiving pegs or dowels (not shown) said pegs or dowels also engaging in selected vertically spaced holes 26 in the plate means 22 and 24 so as to couple said plate means 22 and 24, or as many thereof as are to be driven at any one time to the respective driving frames 14.

The driving frames 14 are connected to structure of the trench shoring apparatus by means of a plurality of driving jacks two of which are indicated by reference numerals 28 and 30 in FIGS. 1 to 4, said jacks being operable to move said driving frames 14 and 16 and any plate means 22 and 24 coupled thereto up and down relative to the side wall structures so that said plate means 22 and 24, guided by the guide frames 16, may be inserted into and withdrawn from the bottom of the trench.

The leading ends of the side wall structures 2 and 4 carry a forward extension 32 whose leading edges are formed as cutting edges and which is cut back towards the longitudinal axis of the shoring apparatus so as to define the rear extremity of a second excavation area for an excavator 34 as will be more fully explained hereinafter. The forward extension 32 is provided with power-operated flaps 32A which can be used for raising the front of the apparatus if necessary. Adapted to straddle the forward extension 32 and to rest on unexcavated ground in advance of the shoring apparatus, is a platform 36 which is hinged to the shoring apparatus and which is movable from an operative to an inoperative position i.e. the positions shown in FIGS. 1 and 4, by a pair of hydraulically-operated platform jacks, one of which is indicated by reference numeral 38, the jacks being connected to the platform 36 and to the forward extension 32.

Referring again to the thrust plate structure 12 this is movable in a corridor formed by the rear extremities of the side wall structures 2 and 4 and carries at each side thereof a bearing pad or foot 40, the pads or feet 40 being mounted on sideways extensions 42 of the thrust plate structure 12 and being movable up and down relative to the thrust plate structure by means of bearing pad jacks 44 mounted on or in the extensions 42. These bearing pads or feet 40 are adapted to engage the ground surface 46 at each side of the trench so as to support the rear of the shoring apparatus from ground level.

In operation, and at the commencement of a cycle of operations a pilot trench is formed by the excavator 34 and the trench shoring apparatus, with the plate means 22 and 24 in their raised positions, is inserted into the pilot trench so that the side wall structures 2 and 4 are in engagement with the side walls of the pilot trench and support the side walls against collapse.

Figure 1:
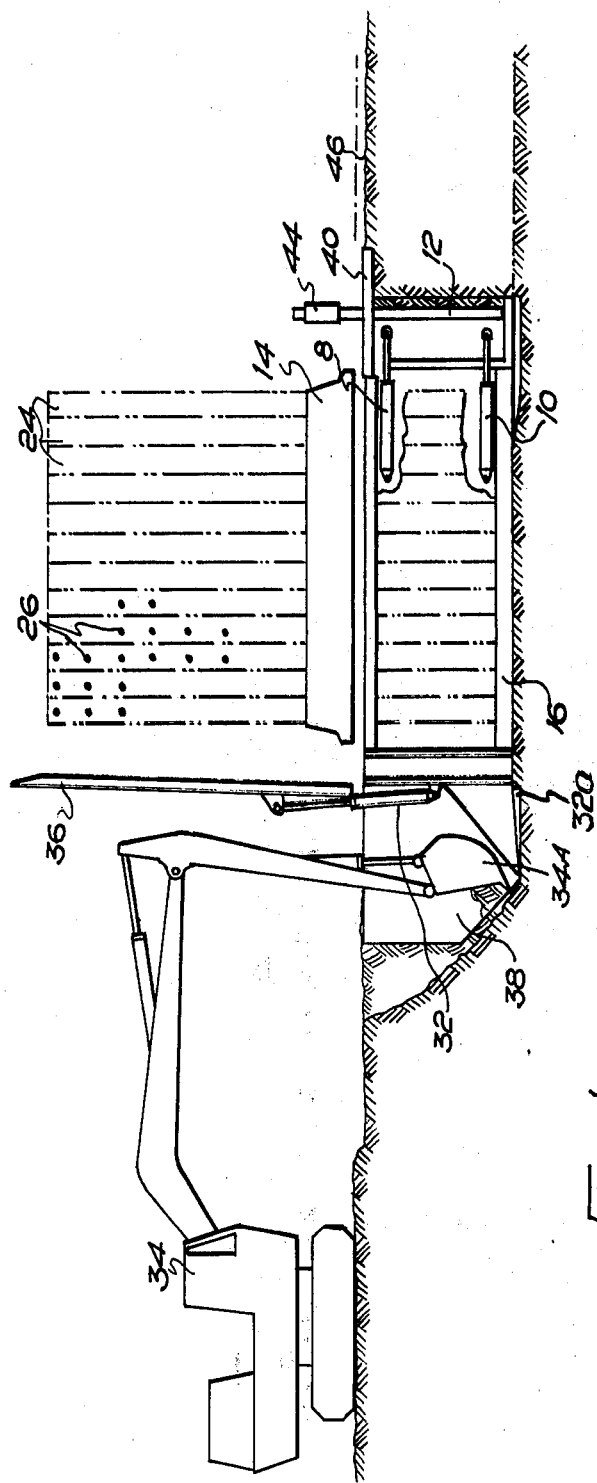
FIG. 1 is a side view of apparatus according to the invention in a first position of operation.

A further section of the pilot trench is then excavated in advance of the first formed section. This is shown in FIG. 1.

Figure 2:
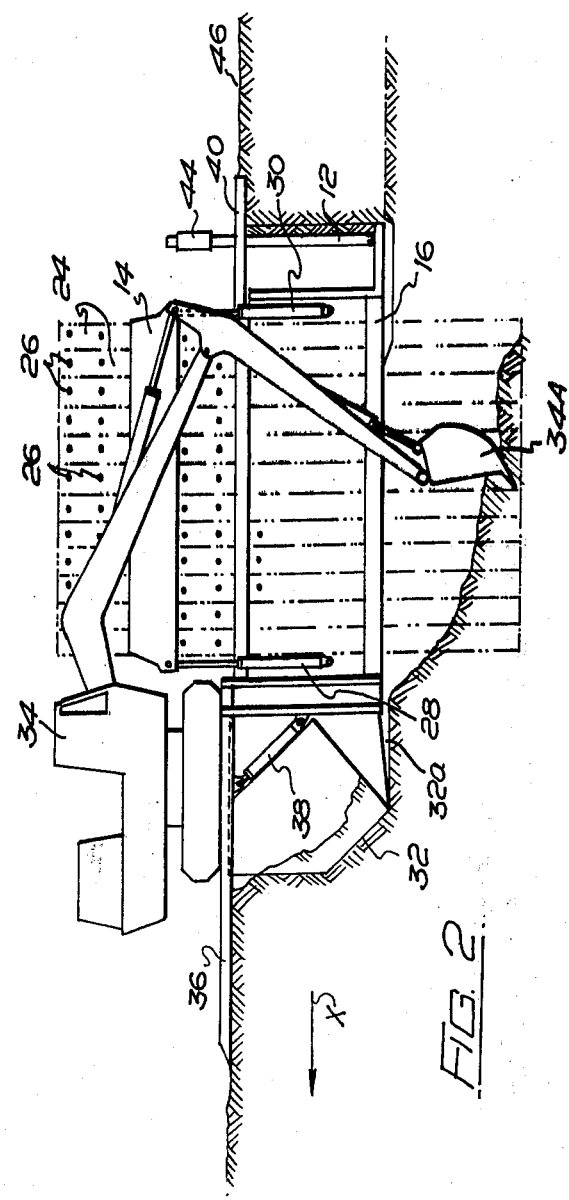
FIG. 2 is a view similar to FIG. 1 showing the apparatus of the invention in a further position of operation.
Figure 3:
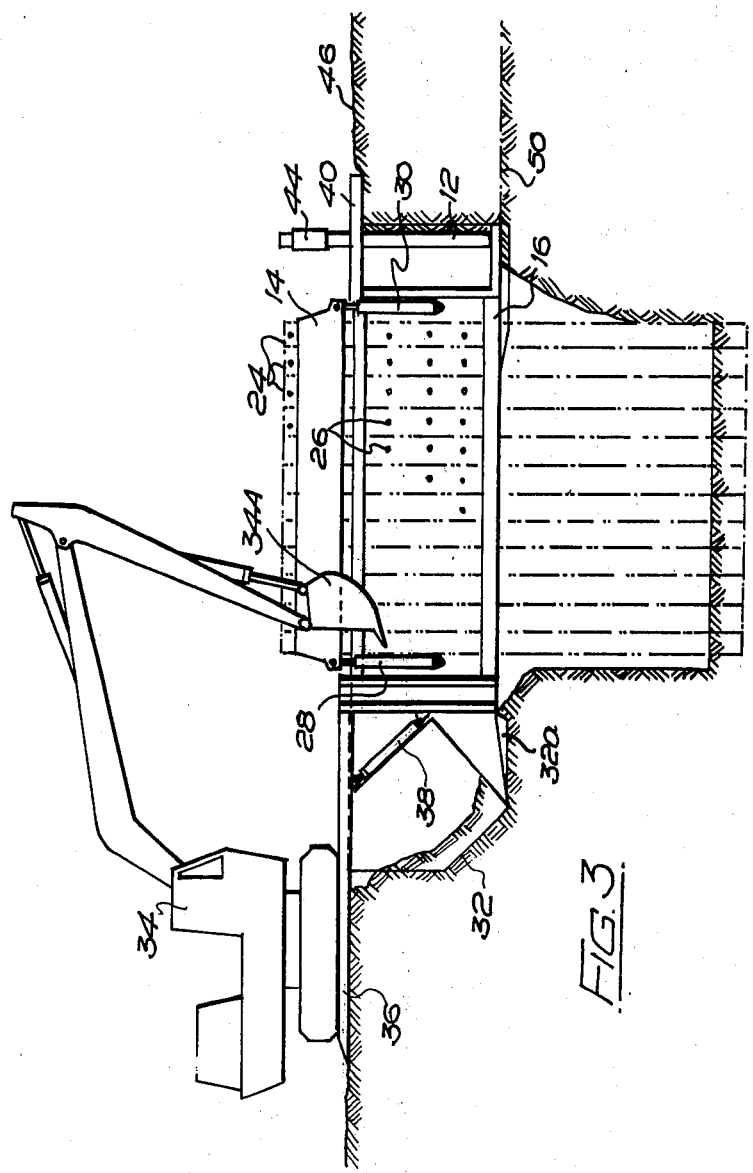
FIG. 3 is a view similar to FIGS. 1 and 2 and showing the apparatus of the invention in yet another position of operation.

Thereafter a selected number of the vertically disposed plate means 22 and 24 are coupled to the driving frames 14 as previously described and by means of the driving rams 28 and 30 the plate means 22 and 24 are driven into the bottom of the trench 6 and with the excavator 34 on the platform 36 — the latter having been lowered into an operative position by the platform jacks 38 — excavation takes place between the partly inserted plate means 22 and 24 as shown in FIG. 2. This continues until the plate means 22 and 24 are fully inserted (FIG. 3) and until a second trench 6A is formed which is of a narrower width than the trench 6 as shown in FIG. 7. The figure also shows that there are ledges 50 between the first trench 6 and the second trench 6A such ledges providing partial support for the side wall stuctures 2 and 4 of the trench shoring apparatus.

A plate is lowered so as to prevent cave-ins at the front of the excavated trench 6A, the plate being manually lowered or alternatively lowered by power - operated means. If preferred, the plate may be coupled to plate means 22 and 24 so as to be lowered with said plate means.

Pipe sections 52 and 54 — see FIG. 4 — are then lowered into the trench 6A, a foundation 56 having previously been laid, by attaching a sling 58 to the bucket 34A of the excavator 34 and the pipe sections coupled together as necessary.

Thereafter, the plate is moved to an inoperative position (in FIG. 5 the plate has been removed completely) the plate means 22 and 24 are moved upwardly by reversal of the driving jacks 28 and 30 to the position shown in FIG. 5, whereafter the pipe sections 52 and 54 are covered over with spoil by the excavator 34.

Referring now to FIG. 6, the excavator 34 is moved off the platform 36 and the platform is raised to its inoperative position shown by actuation of the platform jacks 38. The rear of the shoring apparatus is then supported from ground level by actuation of the bearing pad jacks 44 so that the bearing pads or feet 40 rest upon the ground surface 46 and the excavator excavates a further section of the first trench 6 in the advance of the trench shoring apparatus. The spoil taken from this further excavation is placed by the excavator behind the thrust plate structure 12, whereafter the hydraulically-operated jacks 8 and 10 are actuated. This actuation firstly causes rearward movement of the thrust plate structure 12 so as to compact the returned spoil and then, when the resistance of the compacted spoil is greater than the driving force in the jacks 8 and 10 causes forward movement of the side wall structures so that the leading portion of the trench shoring apparatus moves into the further section of the trench 6 being formed by the excavator 34. During this movement of the shoring apparatus the rear of the shoring apparatus is fully supported from ground level by the bearing pads or feet 40 and the side wall structures 2 and 4 may be additionally supported by the ledges 50 between the first trench 6 and the second trench 6A. As the thrust plate structure 12 will be moved forwardly and rearwardly several times during the compaction of the returned spoil and the forward movement of the side wall structures 2 and 4, the bearing pads or feet 40 will be in engagement with the ground surface 46 during the forward movement of the thrust plate structure and will preferably be raised during the rearward movement of the structure.

When the shoring apparatus has been moved forwardly as described the cycle of operation is repeated.

In an alternative embodiment of the invention, the bearing pads or feet 40 may be replaced by movable flaps or plates which are mounted for pivotal movement in vertical planes. In this instance, the cross-members towards the leading ends of the side wall structures will extend beyond the outer extremities of the side wall structures so as to form outriggers which will have pivotally connected thereto at each end thereof a flap or plate.

The other end of each flap or plate is pivotally connected to a piston of an associated fluid pressure-operated piston-and cylinder device, the cylinder of which is pivotally connected to superstructure carried by the upper cross-members towards the trailing ends of the side wall structures. Each flap or plate has its own piston and cylinder device and superstructure and each piston-and-cylinder device may be operated independently of the other, or they may be operated in unison.

In use, the flaps or plates are moved by the piston-and-cylinder devices so that trailing ends of the flaps or plates contact the ground surface so as to support the rear of the trench shoring apparatus during movement thereof.

Thus it will be seen with a method and apparatus according to the invention, that the disadvantages of the prior known device are obviated in that the method and apparatus is useful in the laying of pipes of any diameter and that no superimposed loading is placed on the laid pipe sections since the trench shoring apparatus is supported from ground level. The apparatus of the invention fully supports the whole of the excavation i.e. the walls of the pilot trench and the second trench, and prevents cave-ins and the like, and the apparatus of the invention is movable in the direction of the trench by means included in the shoring apparatus i.e. by the jacks and the thrust plate structure which thus obviate the need for heavy lifting equipment. Due to the fact that the trench shoring apparatus of the invention is not in contact with the pipe sections laid in the trench, such pipe sections will not be subjected to damage or disturbance. In addition, collared pipes as well as smooth exterior pipes can be laid using the method and apparatus according to the invention.

Increasing trench depths can be accommodated with the method and apparatus of the invention, since it is only necessary to increase the length of the plate means and to drive them into the unexcavated ground to a greater distance.

In addition, the provision of the platform at the front of the apparatus enables the excavator to be quickly and easily positioned for excavating between the inserted plate means without the necessity of filling in at the front of the apparatus.

Finally, the apparatus according to the invention can be easily and conveniently adjusted to level if necessary by use of the bearing pads or feet, or by use of the flaps or plates and/or the flaps at the front of the machine previously described.

What we claim is:

1. A method for the laying of the pipeline in a ground trench comprising the steps of
    a. excavating a first pilot trench below ground level,
    b. inserting into said pilot trench a trench shoring frame that provides lateral barriers to the inward movement of the sides of the pilot trench,
    c. inserting a plurality of vertically disposed plate means downwardly into said pilot trench along two lines which are inwardly of and substantially parallel to the aforesaid lateral barriers,
    d. forcing said two lines of plate means vertically downwardly into the earth to a level substantially below the level of the bottom of said pilot trench,
    e. excavating the material between said two lines of plate means so as to form a second trench disposed below said pilot trench so that the sides of said second trench are fully supported by said two lines of plate means, the width of said second trench being less than the width of said pilot trench so that a ledge is formed between the bottom of said pilot trench and the top of said second trench,
    f. inserting a pipe section into said second trench,
    g. withdrawing said two lines of plate means vertically upwardly, and
    h. supporting said trench shoring frame by ground level supporting means while advancing the trench shoring frame horizontally into an area which has been excavated for said first pilot trench, said advancement being achieved by applying hydraulic pressure between said trench shoring frame and a substantially stationary wall of earth.

2. The method according to claim 1 wherein said first pilot trench has a length that is considerably longer than the length of said trench shoring frame, providing support means across that portion of the pilot trench which is outside of said trench shoring frame, and moving an excavator onto said support means so that it may excavate the material in the manner set forth in step (e).

3. A method for the laying of a pipeline in a ground trench comprising the steps of
    a. excavating a first pilot trench below ground level, and then excavating a second pilot trench which is aligned with and is a continuation of said first pilot trench, b. inserting into said first pilot trench a trench shoring frame that provides lateral barriers to prevent the inward movement of the sides of said first pilot trench,
c. inserting a plurality of vertically disposed plate means downwardly into said first pilot trench along two lines which are inwardly of and substantially parallel to the aforesaid lateral barriers,
d. forcing said two lines of plate means vertically downwardly into the earth to a level substantially below the level of the bottom of said first pilot trench,
e. excavating the material between said two lines of plate means with an excavating machine so as to form a deep trench disposed below said first pilot trench so that the sides of said deep trench are fully supported by said two lines of plate means, the width of said deep trench being less than the width of said first pilot trench so that a ledge is formed between the bottom of said first pilot trench and the top of said deep trench,
f. inserting at least one pipe section into said deep trench,
g. withdrawing said two lines of plate means vertically upwardly,
h. covering said at least one pipe section with earth once it is in the desired place,
i. supporting the top of said trench shoring frame at approximately ground level while advancing the trench shoring frame horizontally into said second pilot trench, said advancement being achieved by applying hydraulic pressure between said trench shoring frame and an end wall that is pressed against earth deposited rearwardly of said first pilot trench.

* * * * *